Nov. 29, 1927.

H. T. NONES 1,650,998

PARACHUTE FABRIC

Filed Sept. 4, 1926

3 Sheets-Sheet 1

Nov. 29, 1927.

H. T. NONES 1,650,998

PARACHUTE FABRIC

Filed Sept. 4, 1926

3 Sheets-Sheet 2

Patented Nov. 29, 1927.

1,650,998

UNITED STATES PATENT OFFICE.

HIRAM T. NONES, OF WASHINGTON, DISTRICT OF COLUMBIA.

PARACHUTE FABRIC.

Application filed September 4, 1926. Serial No. 133,617.

My invention relates to woven textile fabrics, particularly for use in making parachutes, but also useful for other purposes.

The principal object of my invention is to produce a fabric having all the qualities required for parachute fabric, and in addition other qualities or improved characteristics in which the best parachute fabrics heretofore produced are deficient.

The accompanying drawing shows on an enlarged scale examples of fabric illustrating my invention.

The best parachute fabrics heretofore available are not only costly, but possess a number of defects affecting the practical use of the parachutes made therefrom. As known, the parachute is carried folded in as compact or flat a form as practicable, and when launched, opens rapidly, the folds slipping over one another. This creates friction between the folded surfaces and tends to cause friction burns, scorching and weakening the fabric. Being folded compactly, the fabric creases sharply, at the folds, weakening or "cracking" the fibres at the creases, and tending to make rips, especially when the sudden strain, due to the opening of the parachute and checking the drop of the aeronaut, comes on the parachute. Frequent inspection, requiring repeated folding and unfolding of the parachute, is required for incipient or actual rips, and the repairs involved are a considerable item of parachute expense and maintenance.

Parachute fabric at present employed is of a smooth and close texture, whereby the porosity or permeability to air necessary for the proper and safe descent of the aeronaut, is limited or restricted, so that in certain types of parachutes air vents or valves have to be provided. Furthermore, as apparent, insufficient permeability to air increases the sudden strain put upon the fabric when it opens.

Aside from the foregoing, a parachute fabric is required to possess certain characteristics, such as imposed by government specifications. It is required to be light and strong, the limit usually being that its weight shall be less than two ounces per square yard. It must be balanced, or of substantially equal tensile strength in all directions; and it must have elasticity or stretch to take up the shock when the parachute suddenly opens to check the descent of the aeronaut, and this elasticity is required to be substantially uniform in the direction of both warp and filling, and it must have resistance to ripping.

Figure 1:
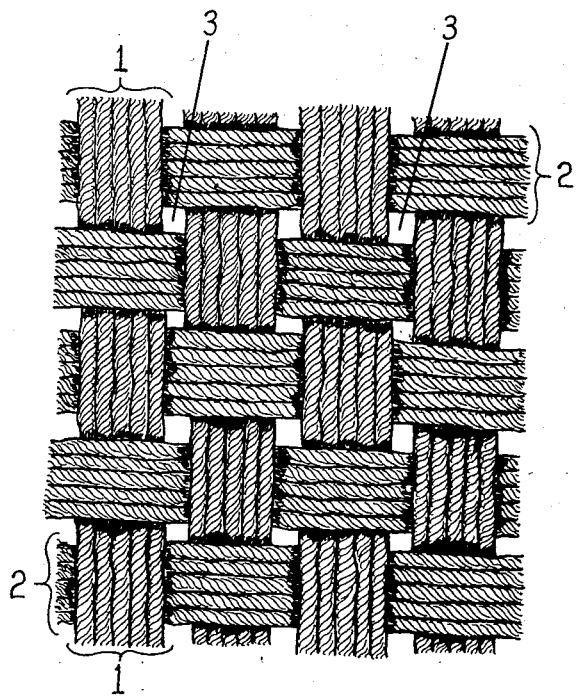

I have discovered that the defects indicated may be overcome, and the characteristics required may be attained, and in a greater degree, by making the fabric in accordance with a special weave. Heretofore parachute fabrics have been of plan weave, wherein each thread alternates with its adjacent thread in each direction. In accordance with my invention, however, I employ groups of threads, consisting of two, three, four, five, or other plurality of threads in a group, said groups forming both the warp and filling. These groups of threads are interwoven as groups in both directions. I have indicated in Figure 1 one form of weave, illustrating my invention, in which each group is made up of five threads. The groups 1 are the warp groups, each of which consists of five threads, each of said groups thus forming a flat five-strand warp. Similarly, the groups 2 are the weft or filling groups, each group likewise constituting a flat five-strand weft. The warp and weft groups are interlaced or interwoven with one another, each warp group passing alternately over and under successive weft groups. In this manner a fabric of great strength and elasticity in both directions is produced, with interstices 3 at the adjacent crossings of the groups, affording a higher degree of permeability than in a fabric of plain weave. It will be understood that a less number of threads may be employed to constitute a group.

Figure 2:
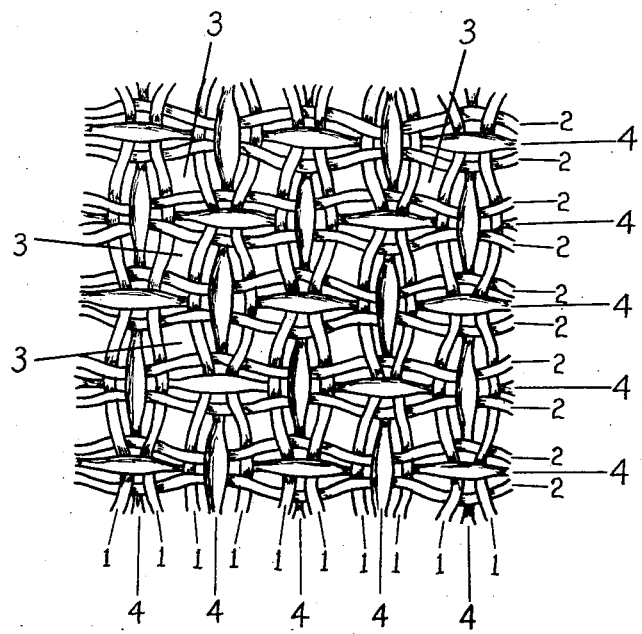

In Figure 2 I have shown a somewhat different weave in which the warp and weft groups each consists of two threads, the warp group being indicated at 1, 1 and the weft group being indicated at 2, 2. In addition each warp and weft group contains a binder thread 4 interlaced arbitrarily with the other threads of its group and those of the weft group. In the drawing these binder threads pass alternately over and under all the threads including the binder of the crossing groups. It will be seen that this form of weave also provides the interstices 3 adjacent the crossing groups affording the desired permeability. The binder gives great stability and strength to the fabric, securely holding the threads in place.

Figure 3:
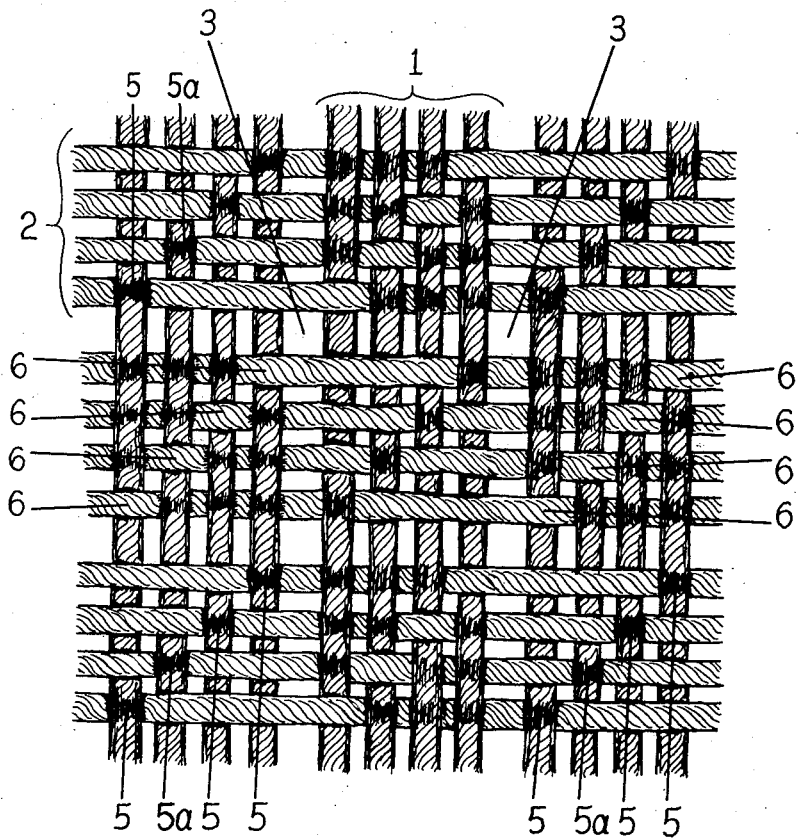

In Figure 3 I have shown another form of fabric illustrating my invention. This form resembles Figure 1, but the threads of each group 1 and 2 are woven to form binders with those of the other group. According to this form of weave, one thread 5 of a warp group will pass under (or over) some of the threads 6 of the weft group and over the remainder of the group; the next warp thread 5ª of the group will also pass under (or over) some of the threads of said weft group, and over the remainder, but not the same weft threads as the said first warp thread. This arrangement of binder may be arbitrarily or differently arranged from that described, as by passing over two or more cross threads and under the remainder of the group, as may be desired. This form of weave also provides the interstices 3 for permeability.

It will be seen that by the arrangement of the threads in groups the fabric produced is considerably stronger, as well as more elastic than the parachute fabric now employed. Also that its resistance to ripping is much greater since said resistance does not depend on a single thread, as in fabrics now used, but is reinforced by the other threads of the group. Rips, or perforations, as by bullet holes, in the fabric of my invention are localized and do not spread or enlarge. The fabric of my invention also presents much greater air permeability than fabrics heretofore made, since openings or interstices 3 are produced at the crossings of the groups, thus providing a multiplicity of air vents which render the use of specially made air vents either unnecessary, or provide a safety relief should the specially made air vents fail to function. The said openings or interstices 3 are uniformly distributed, and retain their size and are not distorted or closed under strains of the fabric, since owing to the manner of arranging the threads in groups, and especially when the binder thread is employed the threads are securely held in position.

By arranging and interweaving the threads as described a fabric is produced presenting a multiplicity of elevations, where the groups cross, thus giving a rougher or less smooth surface than fabrics now employed woven of single threads. There is thus less surface in contact when the fabric is folded, and consequently less friction and less liability to friction burns when the folds slide over one another when the parachute suddenly opens.

Fabric made in accordance with my invention shows under U. S. Bureau of Standards tests superior characteristics to the best quality parachute fabric heretofore available. Its weight per square yard is less than the present limit of two ounces per square yard, being from 1.3 to slightly less than 2.00 ounces per square yard. Its stretch or elasticity is greater than the best fabric heretofore available, being at 20 pounds load 8 per cent in the warp and 8 per cent in the filling, as compared with 11.4 per cent in the warp and 5.4 per cent in the filling shown by the best fabric heretofore available. And at 5 pounds load the stretch shown by my fabric is 18 per cent in the warp and 21 per cent in the filling as compared with 35 per cent in the warp and 26 per cent in the filling shown by the best fabrics heretofore available, thus giving a much better or more evenly balanced fabric in this important respect. The permeability of my fabric is considerably greater than that shown by the best fabrics heretofore available, being at one pound pressure per square foot 125.4 cubic feet per minute as compared with 62.9 cubic feet per minute of the best fabrics heretofore known—i. e., my fabric shows about 100 per cent greater air permeability than the best fabrics heretofore available. The breaking strength of my fabric is 45 pounds warp and 58 pounds filling as compared with 39 pounds warp and 67 pounds filling shown by the best fabrics heretofore available. The average tearing resistance of my fabric is 6.18 pounds in the warp direction and 6.27 pounds for the filling, as compared with 1.81 for the warp and 4.01 for the filling shown by the best fabrics heretofore available. The resistance to ripping shown by my fabric in pounds per inch is 18 in the warp direction and 15 in the filling as compared 8 in the warp and 11 in the filling as shown by the best fabrics heretofore available.

It is to be understood that the foregoing figures as to tests are illustrative of my invention and are not to be taken as limitations.

While I have described my invention as more particularly designed for parachutes, it is obvious that such fabric possesses valuable qualities for other uses, such as for clothing and the like, where ventilation, strength and elasticity are desirable, and my invention includes such uses.

It will be understood that for the principal purposes mentioned, the fabric will be generally made of silk; and it is a further feature of my invention that it permits the use of cheaper grades of raw silk for parachute cloth, such as tamaiyoka, doppioni, tsatlee, re-reels, or even tussah, not heretofore practicable or permissible for use in such fabric. Also, the manner of constructing the fabric permits the use of cheaper fibres than silk, either in whole or in admixture with silk.

It will be understood that modifications and changes may be made in the details of

What I claim is—

1. A parachute comprising a woven fabric in which a plurality of both adjacent warp and adjacent weft threads cross each other together in such a manner as to materially increase the permeability of the fabric over that of a one-and-one weave fabric of the same material.

2. A parachute comprising a woven fabric in which a plurality of both adjacent warp and adjacent weft threads cross each other in such a manner as to materially increase the roughness of the surface of said fabric over that of a one-and-one weave fabric of the same material.

3. A parachute comprising a woven fabric in which a plurality of both adjacent warp and adjacent weft threads cross each other together and in which a binder thread interlaces arbitrarily with other threads of its group and those of the weft group in such manner as to materially increase the permeability and tearing resistance of the fabric over that of a one-and-one weave fabric of the same material.

4. A parachute comprising a woven fabric in which a plurality of both adjacent warp and adjacent weft threads cross each other in interwoven relation in such manner as to materially increase the permeability and roughness of the fabric over that of a one-and-one weave fabric of the same material.

5. A parachute comprising a woven fabric having a plurality of adjacent warp and adjacent weft threads interwoven with one another and having a breaking strength exceeding approximatly 40 pounds in both warp and weft directions and having a permeability to air in excess of 100 cubic feet per minute at approximately one pound pressure per square foot.

6. A parachute comprising a woven fabric in which a plurality of both adjacent warp and adjacent weft threads cross each other together, said fabric having a breaking strength exceeding approximately 40 pounds in both warp and weft directions, having a tearing resistance of approximately six pounds in both warp and weft directions, having a ripping resistance of approximately 18 pounds per square inch in the warp direction and 15 pounds per square inch in the weft direction, and having a permeability to air in excess of 100 cubic feet per minute at approximately one pound pressure per square foot.

7. A parachute comprising a woven fabric in which the warp and weft threads are arranged in groups, said groups being spaced and crossing each other in such a manner as to materially increase the air permeability of said fabric over that of a one and one weave of the same material.

8. A parachute comprising a woven fabric in which the warp and weft threads are arranged in groups with alternate individual strands of each warp group crossing alternate individual strands of each weft group on opposite sides so as to effectively increase the air permeability of the parachute over one having a one and one weave fabric of the same material.

9. A parachute comprising a woven fabric in which the warp and weft threads are arranged in groups, said groups being spaced and crossing each other so as to effectively increase the roughness of the surface of said fabric over that of a one and one weave fabric of the same material.

10. A parachute comprising a woven fabric having a plurality of both adjacent warp and adjacent weft threads which cross each other together and having a binder thread for each group arbitrarily interlacing with the remaining threads of the group and with those of the weft groups to produce an air permeability to excess of one hundred cubic feet per minute at approximately one pound pressure per square foot and a ripping resistance of approximately eighteen pounds per square inch in the warp direction and fifteen pounds per square inch in the weft direction.

11. A parachute comprising a woven fabric in which the warp and weft threads are arranged in groups, said groups being spaced and interwoven so as to effectively increase the air permeability and roughness of the fabric over that of a one and one weave fabric of the same material.

HIRAM T. NONES.